US009536120B2

(12) United States Patent
Lu et al.

(10) Patent No.: US 9,536,120 B2
(45) Date of Patent: Jan. 3, 2017

(54) METHOD FOR ENHANCING STABILITY OF COMMUNICATION BETWEEN A CONTACTLESS CARD AND A CARD READER

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 345 days.

(21) Appl. No.: 14/115,942

(22) PCT Filed: May 7, 2013

(86) PCT No.: PCT/CN2013/075258
§ 371 (c)(1),
(2) Date: Nov. 6, 2013

(87) PCT Pub. No.: WO2014/026491
PCT Pub. Date: Feb. 20, 2014

(65) Prior Publication Data
US 2015/0205987 A1    Jul. 23, 2015

(30) Foreign Application Priority Data
Aug. 16, 2012 (CN) .......................... 2012 1 0291655

(51) Int. Cl.
*G06K 7/10* (2006.01)
*G06Q 20/20* (2012.01)
*G06Q 20/34* (2012.01)
(52) U.S. Cl.
CPC ....... *G06K 7/10366* (2013.01); *G06K 7/10009* (2013.01); *G06Q 20/204* (2013.01); *G06Q 20/352* (2013.01)

(58) Field of Classification Search
None
See application file for complete search history.

(56) References Cited

U.S. PATENT DOCUMENTS 6,585,164 B1    7/2003  Cooreman et al.
6,655,588 B2   12/2003  Fukazawa
(Continued)

FOREIGN PATENT DOCUMENTS

CN       1336619 A     2/2002
CN     101894246 A    11/2010
(Continued)

OTHER PUBLICATIONS

International Search Report and Written Opinion (both in Chinese only) for PCT/CN2013/075258, mailed Aug. 15, 2013; ISA/CN.

*Primary Examiner* — Benjamin C Lee
*Assistant Examiner* — Rajsheed Black-Childress
(74) *Attorney, Agent, or Firm* — Harness, Dickey & Pierce, P.L.C.

(57) ABSTRACT

The invention discloses a method for enhancing stability of communication between a contactless card and a card reader, relating to communication field. In the method, the card reader initiates time-out timing and a receiver, waits for receiving data, when the time-out does not happen and sub-carrier wave is detected, the card reader stops time-out timing, receives data and determines whether there is frame error in the received data frame, if yes, discards the data frame and goes on time-out timing; otherwise, determines whether CRC check and/or parity check of the data frame is correct, if the CRC check and/or the parity check of the data frame are correct, determines whether there is other error in the data frame, if there is other error in the data frame, discards the data frame and goes on time-out timing; if there is not other error in the data frame, shuts down the receiver and sends the received data to a host; or if the CRC check (Continued)

and/or the parity check of the data frame are not correct, determines whether length of the data frame is smaller than preset byte, if length of the data frame is smaller than preset byte, discards the data frame and goes on time-out timing; if length of the data frame is not smaller than preset byte, determines whether the data frame is integrate, if the data frame is integrate, shuts down the receiver; if the data frame is not integrate, discards the data frame and goes on time-out timing.

12 Claims, 4 Drawing Sheets

(56) References Cited

U.S. PATENT DOCUMENTS

| | | | |
|---|---|---|---|
| 2002/0020744 A1 | 2/2002 | Fukazawa | |
| 2003/0120992 A1* | 6/2003 | Glaise | H03M 13/091 714/781 |
| 2007/0194936 A1* | 8/2007 | Hoshina | G06K 7/10237 340/572.8 |
| 2012/0159163 A1 | 6/2012 | von Behren et al. | |

FOREIGN PATENT DOCUMENTS

| | | |
|---|---|---|
| CN | 102156828 A | 8/2011 |
| CN | 102880842 A | 1/2013 |

* cited by examiner

METHOD FOR ENHANCING STABILITY OF COMMUNICATION BETWEEN A CONTACTLESS CARD AND A CARD READER

CROSS-REFERENCE TO RELATED APPLICATIONS

This application is a 371 U.S. National Stage of International Application No. PCT/CN2013/075258 filed on May 7, 2013, which claims priority to Chinese Patent Application No. 201210291655.X, filed on Aug. 16, 2012. The contents of the above applications are incorporated herein by reference in their entirety.

FIELD OF THE INVENTION

The invention relates to communication field and in particular to a method for enhancing stability of communication between a contactless card and a card reader.

BACKGROUND OF THE INVENTION

A contactless card is a new type smart card in combination with RF (radio frequency) technology and IC card technology. Except for functions owned by a contact ID card and a contact IC card, for the contactless card, it does not need a power supply, but acquires power supply by induction from magnetic field of a card reader through its receiving antenna, processes data and feeds back to the card reader. Compared with a contact IC card, the contactless card has advantages of high reliability, simple operation, anti-conflict, more applications adaptability and well encryption performance and therefore it is widely used.

The inventors find at least the following shortcomings in the prior art in process of implementing the invention: the present communication between a contactless card reader and a contactless card is easy to be interrupted by outside RF and thus has weaker stability, and after the two sides receive wrong data frames, exception handling with the mistake will be directly executed, such as error reporting and resending etc., which results in lower success rate when receiving data for more times in interrupted circumstance.

SUMMARY OF THE INVENTION

In consideration of shortcomings of the prior art and in order to solve the shortcomings efficiently, the invention provides a method for enhancing stability of communication between a contactless card and a card reader.

The method of the invention is realized with the following solution.

A method for enhancing stability of communication between a contactless card and a card reader, which includes:

Step a, initiating, by the card reader, time-out timing and a receiver, and waiting for receiving data returned by the card;

Step b, determining whether timeout happens, if yes, shutting down the receiver and sending a time-out error prompt to a host; otherwise, going to Step c;

Step c, determining whether a sub-carrier wave is detected, if yes, stopping time-out timing, receiving data frame and going to Step d; otherwise, returning to Step b; the subcarrier wave being an outside carrier wave signal detected by the card reader;

Step d, determining whether there is a frame error in the received data frame, if yes, discarding the received data frame, going on timeout timing and returning to Step b; otherwise, going to Step e;

Step e, determining whether CRC check and/or parity check of the received data frame are correct, if yes, going to Step h; otherwise, going to Step f;

Step f, determining whether length of the received data frame is smaller than a preset byte, if yes, discarding the received data frame, going on timeout timing and returning to Step b; otherwise, going to Step g;

Step g, determining whether the received data frame is integrate, if yes, shutting down the receiver and sending a transfer error prompt to the host; otherwise, discarding the received data frame, going on timeout timing and returning to Step b; and Step h, determining whether there is other error in the received data frame, if yes, discarding the received data frame, going on timeout timing and returning to Step b; otherwise, shutting down the receiver and sending the data returned by the card to the host.

Preferably, Step f can be replaced with determining whether the received data is integrate, if yes, going to Step g; otherwise, discarding the received data frame, going on timeout timing and returning to Step b; and correspondingly, Step g can be replace with determining whether length of the received data frame is smaller than a preset byte, if yes, discarding the received data frame, going on timeout timing and returning to Step b; otherwise, shutting down the receiver and sending a transfer error prompt to the host.

Preferably, the frame error includes that the data frame is not received or there is frame header error or frame footer error in the received data frame or the received data frame is a vacant frame.

Preferably, the determining whether the received data frame is integrate includes determining whether bit number of the received data frame is integer times of 8, if yes, the received data frame is determined integrate; otherwise, the received data frame is determined not integrate.

Preferably, the other error includes that length of the data frame is larger than a length regulated by a protocol or smaller than minimum length regulated by the protocol.

Preferably, the sending a timeout error prompt to the host includes sending a timeout error prompt to the host through a USB interruption channel;

the sending a transfer error prompt to the host includes sending a timeout error prompt to the host through a USB interruption channel; and the sending the received data returned by the card to the host includes sending the received data returned by the card to the host through a USB interruption channel.

Preferably, before the card reader initiating timeout timing and the receiver, the method further includes that powering on and initializing the card reader and determining type of instruction upon receiving valid instruction;

if the valid instruction is a card seeking instruction, performing card-seeking operation and determining whether the card-seeking operation is successful, if yes, sending a response instruction of requesting for selection, sending the response instruction of selection to the host upon receiving a selection responding response returned by the card and informing the host of the card in the radio frequency field through a USB interruption channel; if no, informing the host of a response of the card leaving the radio frequency field through a USB interruption channel;

if the valid instruction is an APDU instruction, sending the APDU instruction to the card in specified format and going to Step a; and if the valid instruction is an extension instruction, executing the extension instruction and sending an operation result to the host through a USB interruption channel.

A method for enhancing stability of communication between a contactless card and a card reader, which includes:

Step A, initiating, by the card reader, timeout timing and a receiver, and waiting for receiving data returned by the card;

Step B, determining whether timeout happens, if yes, shutting down the receiver and sending a time-out error prompt to a host; otherwise, going to Step C;

Step C, determining whether a sub-carrier wave is detected, if yes, stopping time-out timing, receiving the data frame and going to Step D; otherwise, returning to Step B; the sub-carrier wave being an outside carrier signal detected by the card reader;

Step D, determining whether there is frame error in the received data frame, if yes, discarding the received data frame, going on time-out timing and returning to Step B; otherwise, going to Step E;

Step E, determining whether length of the received data frame is smaller than a preset byte, if yes, discarding the received data frame, going on time-out timing and returning to Step B; otherwise, going to Step F;

Step F, determining whether the received data frame is integrate, if yes, going to Step G; otherwise, discarding the received data frame, going on time-out timing and returning to Step B;

Step G, determining whether CRC check and/or parity check are correct, if yes, going to Step H; otherwise shutting down the receiver and sending a transfer error prompt to the host; and Step H, determining whether there is other error in the data frame, if yes, discarding the received data frame, going on time-out timing and returning to Step B; otherwise, shutting down the receiver and sending the received data returned from the card to the host.

Preferably, Step E is replaced with determining whether the received data frame is integrate, if yes, going to Step F; otherwise, discarding the received data frame, going on time-out timing and returning to Step B; and correspondingly, Step F is replaced with determining length of the received data frame is smaller than a preset byte, if yes, discarding the received data frame, going on time-out timing and returning to Step B; otherwise, shutting down the receiver and sending a transfer error prompt to the host.

Preferably, the frame error includes that the data frame is not received or there is frame header error or frame footer error in the data frame or the received data frame is a vacant frame.

Preferably, the determining whether the received data frame is integrate includes determining whether bit number of the received data frame is integer times of 8, if yes, the received data frame is determined integrate; otherwise, the received data frame is determined not integrate.

Preferably, the other error includes that length of the data frame is larger than length regulated by a protocol or smaller than minimum length regulated by the protocol.

Preferably, the sending time-out error prompt to the host comprises sending the time-out error prompt to the host through a USB interruption channel;

the sending transfer error prompt to a host includes sending the transfer error prompt to the host through a USB interruption channel; and the sending received data returned by the card to the host includes sending the received data returned by the card to the host through a USB interruption channel.

Preferably, before the card reader initiating time-out timing and the receiver, the method further includes:

powering on, initializing the card reader and determining type of instruction upon receiving valid instruction;

if the valid instruction is a card seeking instruction, performing card-seeking operation and determining whether the card-seeking operation is successful, if yes, sending a response instruction of requesting for selection to the card, sending the response instruction of selection to the host upon receiving a selection responding response returned by the card and informing the host of the card being in the radio frequency field through a USB interruption channel; if no, informing the host of a response of the card leaving the radio frequency field through a USB interruption channel;

if the valid instruction is an APDU instruction, sending the APDU instruction to the host in specified form and going to Step a; and if the valid instruction is an extension instruction, executing the extension instruction and sending an operation result to the host through a USB interruption channel.

It is obvious in the method provided by the invention that the card reader initiates time-out timing and a receiver, waits for receiving data, if the time-out timing is stopped in case that the time-out period is not exceeded and a sub-carrier wave is detected, receives data and determines whether there is frame error in the received data frame, if there is frame error, discards the data frame and goes on time-out timing; if there is no frame error, determines whether CRC check and/or parity check of the data frame is correct, if CRC check and/or parity check are correct, determines whether there is other error in the data frame, if there is other error in the data frame, discards the data frame and goes on time-out timing; if there is no other error in the data frame, shuts down the receiver and sends the received data to the host; if CRC check and/or parity check are not correct, determines whether length of the data frame is smaller than the preset byte, if yes, discards the data frame and goes on time-out timing; if no, determines whether the data frame is integrate, if integrate, shuts down the receiver; if no otherwise, discards the data frame and goes on time-out timing. Compared with the prior art, the method of the invention has advantages that the card reader according to the invention can identify and filter interference upon receiving data and therefore communication stability is enhanced.

BRIEF DESCRIPTION OF THE DRAWINGS

In order to clarify the embodiments of the invention or solution of a prior art, simple description will be made of the drawings used by the embodiments or the prior art, and obviously the below descriptive drawings are only part embodiments of the invention, and any other drawing can be obtained with these drawings by a person skill in the art without involving inventive effort.

DETAILED DESCRIPTION OF THE INVENTION

A clear and complete description is made of the solution of the embodiments of the invention in conjunction with drawings of the embodiments, and obviously it is just part of the embodiments of the invention, not the whole embodiments. Based on embodiments of the invention, all other embodiments obtained by a person skill in the art without involving any inventive effort should fall within the scope of protection of the invention.

A method for enhancing stability of communication between a contactless card and a card reader is disclosed, and in the method, when a receiving side receives a data frame and check data (such as CRC, parity check, etc.) reported error, a step of determining length byte of received data frame and determining whether the received data frame footer includes an incomplete byte is added, so that whether the data frame is the data frame being interrupted can be identified. If the data frame is identified as interruption, the received data frame is filtered and the receiving side waits for receiving correct data frame. If the data frame is identified as being interrupted, exception handling such as error reporting or resending is performed.

For example, if the card reader receives a data frame with below errors, it discards the wrong data frame and goes on timeout timing. Such data frame may be:

the received data frame is a vacant frame;

the data representing start or end of the data frame in frame header or frame footer of the received data frame is not satisfied with requirement of a protocol;

there is parity check error and/or CRC check error in the received data frame and length of the data frame is less than 4 bytes; or there is parity check error and/or CRC check error in the received data frame and bit number of the data frame is not integral times of 8.

If the data received by the reader card satisfies with the following conditions, then a transfer error prompt will be sent to a host by a USB interruption channel. Such data frame may be:

the received data frame is not a vacant frame;

the data representing start or end of the data frame in the start or end of the received data frame is satisfied with requirement of a protocol;

there is parity check error and/or CRC check error in the received data frame; or length of the received data frame is not less than 4 bytes and bit number of the received data frame is integral times of 8.

Embodiment 1

Figure 1:
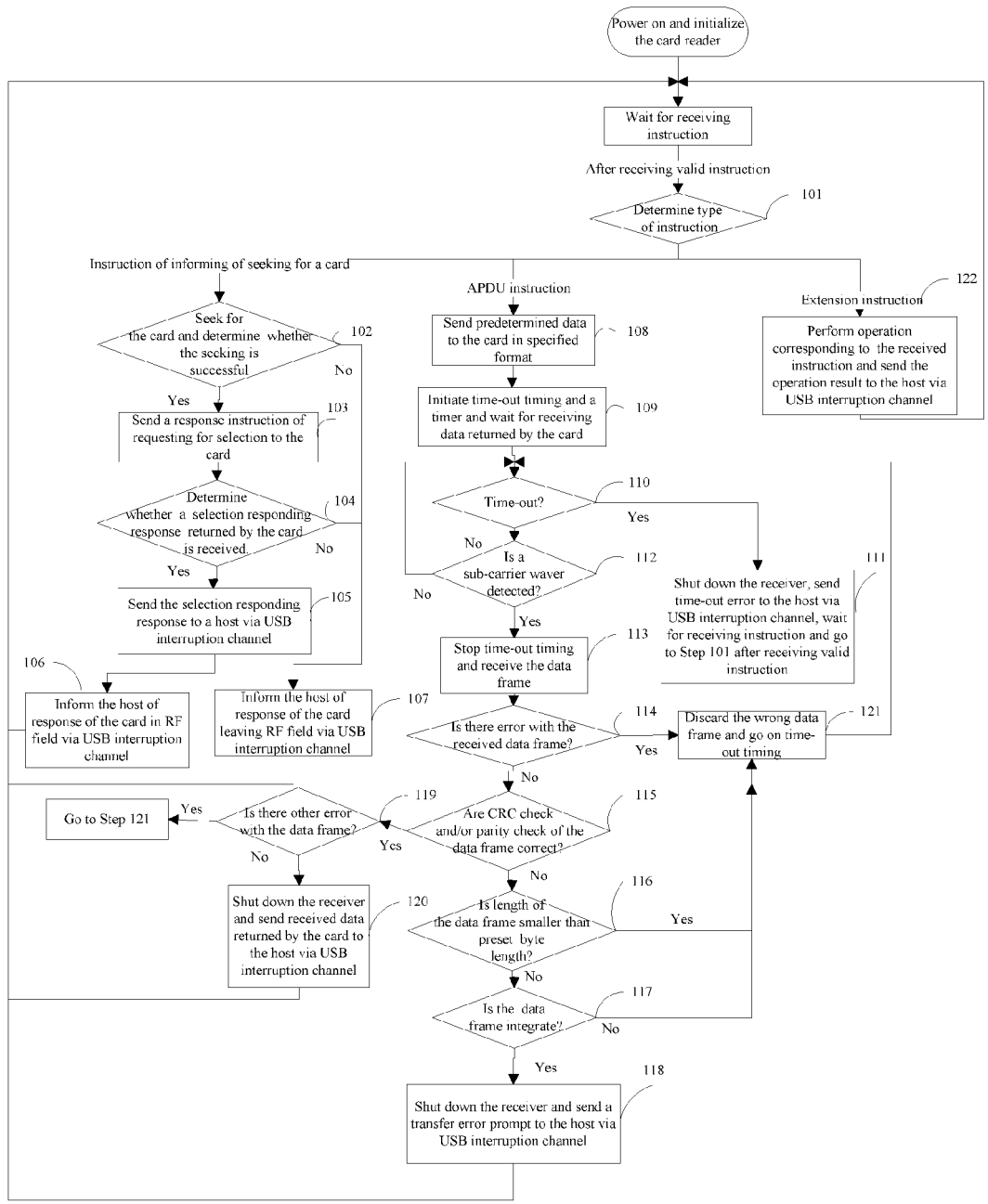
FIG. 1 is a flow chart of a method for enhancing stability of communication between a contactless card and a card reader according to Embodiment 1 of the invention.

As illustrated in FIG. 1, Embodiment 1 of the invention provides a method for enhancing stability of communication between a contactless card and a card reader. In the method, the card reader waits for receiving instruction sent by a host upon power on and initialization. In the embodiment, the card reader receives instruction sent from a buffer through a USB interruption channel. If a first byte of the instruction is within a preset range of 0x01-0x03, a valid instruction is deemed received. If the card reader does not receive the instruction or the first byte of the received instruction is not satisfied with a preset value, the received instruction is not the valid instruction. The card reader performs the following steps upon receiving the valid instruction.

Step 101, determining type of the instruction, if it is instruction of informing of card seeking, going to Step 102; if it is an APDU instruction, going to step 108; if it is an extension instruction, going to Step 122.

Preferably in the embodiment, if the card reader determines that the first byte of the received instruction is 0x01, the instruction is deemed as the instruction of informing of card seeking; if the card reader determines that the first byte of the received instruction is 0x02, the instruction is deemed as the APDU instruction; if the card reader determines that the first byte of the received instruction is 0x03, the instruction is deemed as the extension instruction; of which the extension instruction may be instruction of opening a RF (radio frequency) field, wherein the extension instruction may be an instruction of closing the RF field, an instruction of lighting up, an instruction of lighting off or a buzzer instruction etc.

Step 102, performing card seeking operation and determining whether the card seeking operation is successful, if yes, going to Step 103; otherwise, going to Step 107.

Specifically, for an A-type card, Step 102 includes following steps.

Step A1, sending a first request instruction 0x52 to the card and determining whether a first response 0x02 0x00 made by the card is received, if yes, going to Step A2; otherwise, deeming that card seeking is failed and going to Step 107.

Specifically, the first response is preset data corresponding to the first request instruction, but not limited to data provided by the present embodiment.

Step A2, sending a data packet comprised of data 0x93 and 0x20, determining whether a second response including UID1 and BBC1 is received, if yes, going to Step A3; otherwise, deeming that card seeking is failed and going to Step 107.

Specifically, UID1 is a group of constant data of 4-byte card number segment or a random number dynamically generated by the card and BBC1 is a check byte of UID1.

Step A3, sending a data packet comprised of data 0x93, 0x70, UID1, BBC1 and CRC1, determining whether first confirmation information including S1 and CRC1 returned by the card is received, if yes, going to Step A4; otherwise, deeming card seeking is failed and going to Step 107.

Specifically, CRC1 is a check detecting code and S1 is used to identify a start of communication.

Step A4, performing AND operation on the first confirmation information and constant data 0x40 and determining whether the operation result is 0x00, if yes, deeming card seeking is successful, cascade level of the card being 1, storing the card information of the card in a buffer and going to Step 103; otherwise, going to Step A5.

Specifically, if cascade level of the card is 1, card number information of the card is all 4-byte data of UID1.

Step A5, sending a data packet comprised of data 0x95 and 0x20 to the card, determining whether a third response comprising UID2 and BBC2 returned by the card is received, if yes, going to Step A6; otherwise, deeming card seeking is failed and going to Step 107.

Specifically, UID2 is a group of constant data of 4-byte card number segment or a random number dynamically generated by the card and BBC2 is a check byte of UID2.

Step A6, sending a data packet being comprised of data 0x95, 0x70, UID2, BBC2 and CRC2 to the card and determining whether second confirmation information including S2 and CRC2 returned by the card is received, if yes, going to Step A7; otherwise, deeming card seeking is failed and going to Step 107.

Specifically, CRC2 is a check detecting code and S2 is used to identify a start of communication.

Step A7, performing AND operation on the second confirmation information and constant data 0x40 and determining whether the operation result is 0x00, if yes, deeming card seeking is successful, cascade level of the card being 2, storing card number information of the card in the buffer, and going to Step 103; otherwise, going to Step A8.

Specifically, if cascade level of the card is 2, card number information of the card is combination of the last 3 bytes of UID1 and all 4 bytes of UID2.

Step A8, sending a data packet comprised of data 0x97 and 0x20 to the card and determining whether a fourth response including UID3 and BBC3 returned by the card is received, if yes, going to Step A9; otherwise, deeming card seeking is failed and going to Step 107.

Specifically, UID3 is a group of constant data of 4-byte card number segment or a random number dynamically generated by the card and BBC3 is a check byte of UID3.

Step A9, sending a data packet comprised of data 0x97, 0x70, UID3, BBC3 and CRC3 to the card and determining whether second confirmation information including S3 and CRC3 returned by the card is received, if yes, going to Step A10; otherwise, deeming card seeking is failed and going to Step 107.

Specifically, CRC3 is a check detecting code and S3 is used to identify a start of communication.

Step A10, performing AND operation on third confirmation information and constant data 0x40 and determining whether the operation result is 0x00, if yes, determining card seeking is successful, cascade level of the card being 3, storing the card number information of the card in the buffer and going to Step 103; otherwise, deeming card seeking is failed and going to Step 107.

Specifically, if the cascade level of the card is 3, card number information of the card is combination of the last 3 bytes of UID1, the last 3 bytes of UID2 and all 4 bytes of UID3.

Specifically, for a B-type card, Step 102 includes the following steps.

Step B1, sending B-type request instruction, such as 0x05,0x00,0x08 and CRC (two bytes) to the card; and Step B2, determining whether a B-type request response such as 0x1d, PUPI (four bytes), 0x00, 0x08, 0x01, 0x00 and CRC (two bytes) returned by the card is received, if yes, deeming card seeking is successful and going to Step 103; otherwise, deeming card seeking is failed and going to Step 107.

Specifically, PUPI is used to represent card number information.

Step 103, sending response instruction of requesting for selection to the card.

Specifically, in this embodiment, the response instruction of requesting for selection may be E0, 80 and CRC.

Step 104, determining whether a selection responding response returned by the card is received, if yes, going to Step 105; otherwise, going to Step 107.

Step 105, sending the selection responding response to the host through the USB interruption channel.

Step 106, informing the host of a response of the card in the RF field through the USB interruption channel, waiting for receiving instruction and going to Step 101 upon receiving valid instruction.

Step 107, informing the host of the response of the card leaving the RF field by the USB interruption channel, waiting for receiving instruction and going to Step 101 upon receiving valid instruction.

Step 108, sending received APDU instruction to the card in a specified format.

Specifically, in the embodiment, the specified format is PCB, NAD, CID, APDU instruction or CRC, where PCB is a protocol controlling byte, NAD is a node address, CID is a card identifier and CRC is a check detecting code.

Step 109, initiating time-out timing and a receiver and waiting for receiving data returned by the card.

Step 110, determining whether time-out happens, if yes, going to Step 111; otherwise, going to Step 112.

Step 111, shutting down the receiver, sending a time-out error prompt to the host through the USB interruption channel, waiting for receiving instruction and going to Step 101 upon receiving valid instruction.

Step 112, determining whether a sub-carrier wave is detected, if yes, going to Step 113; otherwise, returning to Step 110.

Specifically, in the embodiment, the signal being sent out by the card reader is carrier wave and the outside signal being detected by the card reader is sub-carrier wave.

Step 113, stopping time-out timing and receiving data frame.

Step 114, determining whether there is frame error in the received data frame, if yes, going to Step 121; otherwise, going to Step 115.

Specifically, in the embodiment, the step of determining whether there is a frame error in the received data frame includes determining whether the data frame is received, determining whether there is frame header error or frame footer error in the received data frame and determining whether the received data frame is a vacant frame, if at least one of the above four determination results is positive, the received data frame is deemed wrong; if all the above four determining results are negative, the received data frame is deemed correct.

Specifically, the frame header error and frame footer error includes that data representing start or end of the data frame in the frame header or the frame footer is not satisfied with protocol; the vacant frame refers to the data frame which only includes frame header and frame footer and does not include data. In the embodiment, 0x10 represents frame header and 0x01 represents frame footer.

Step 115, determining whether CRC check and/or parity check of the received data frame is correct, if yes, going to Step 119, otherwise, going to Step 116.

Step 116, determining whether length of the data frame is smaller than a preset byte, if yes, going to Step 121; otherwise, going to Step 117.

Preferably, in the embodiment, the preset byte is 4.

Step 117, determining whether the data frame is integrate, if yes, going to Step 118; otherwise, going to Step 121.

Specifically, in the embodiment, the step of determining whether the data frame is integrate includes determining whether bit number of the data frame is integer times of 8, if yes, deeming the data frame is integrate; otherwise, deeming the data frame is not integrate.

Step 118, shutting down the receiver, sending a transfer error prompt to the host through the USB interruption channel, waiting for receiving instruction and going to Step 101 upon receiving valid instruction.

Step 119, determining whether there is other error in the data frame, if yes, going to Step 121; otherwise, going to Step 120.

Specifically, the other error includes that length of the data frame is larger than the length regulated by the protocol or smaller than minimum length regulated by the protocol.

Step 120, shutting down the receiver, sending the received data returned by the card to the host through the USB interruption channel, waiting for receiving instruction and going to Step 101 upon receiving valid instruction.

Step 121, discarding the wrong data frame, going on time-out timing and returning to Step 110.

Step 122, performing operation corresponding to the received instruction and sending the operation result to the host through the USB interruption channel.

Taking the instruction of requesting for lighting up as an example, the card reader lights up upon receiving the instruction of requesting for lighting up, and sends successful operation information or failed operation information to the host through the USB interruption channel. The successful operation information is 0x00 and the failed operation information is 0x01.

Figure 2:
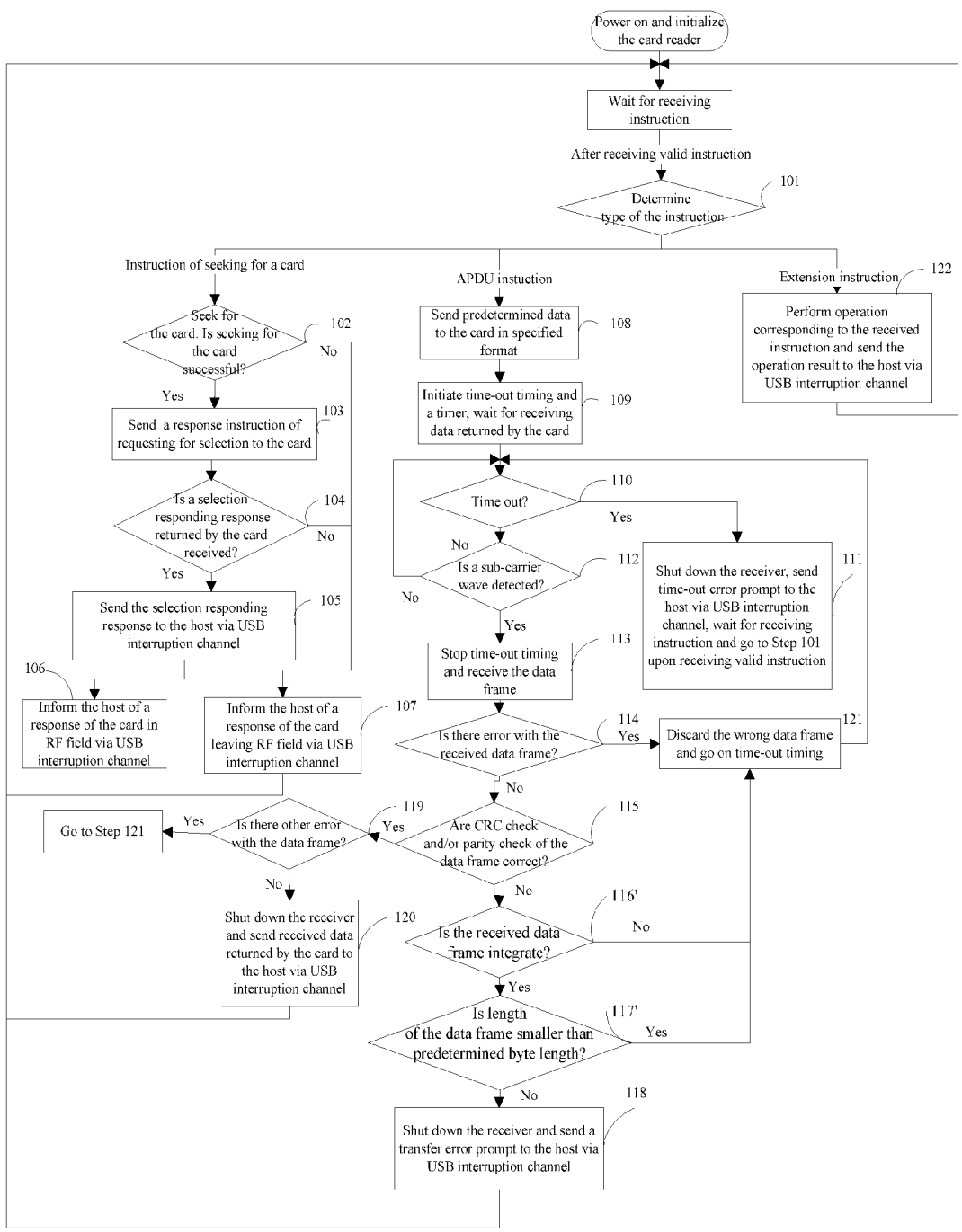
FIG. 2 is a flow chart of another method for enhancing stability of communication between a contactless card and a card reader according to Embodiment 1 of the invention.

As illustrated in FIG. 2, Steps 116 and 117 in FIG. 1 can be replaced with Steps 116' and 117' as below.

Step 116', determining whether the received data frame is integrate, if yes, going to Step 117'; otherwise, going to Step 121.

Step 117', determining whether length of the data frame is smaller than the preset byte, if yes, going to Step 121; otherwise, going to Step 118.

Preferably, in the embodiment, the preset byte is 4.

Embodiment 2

Figure 3:
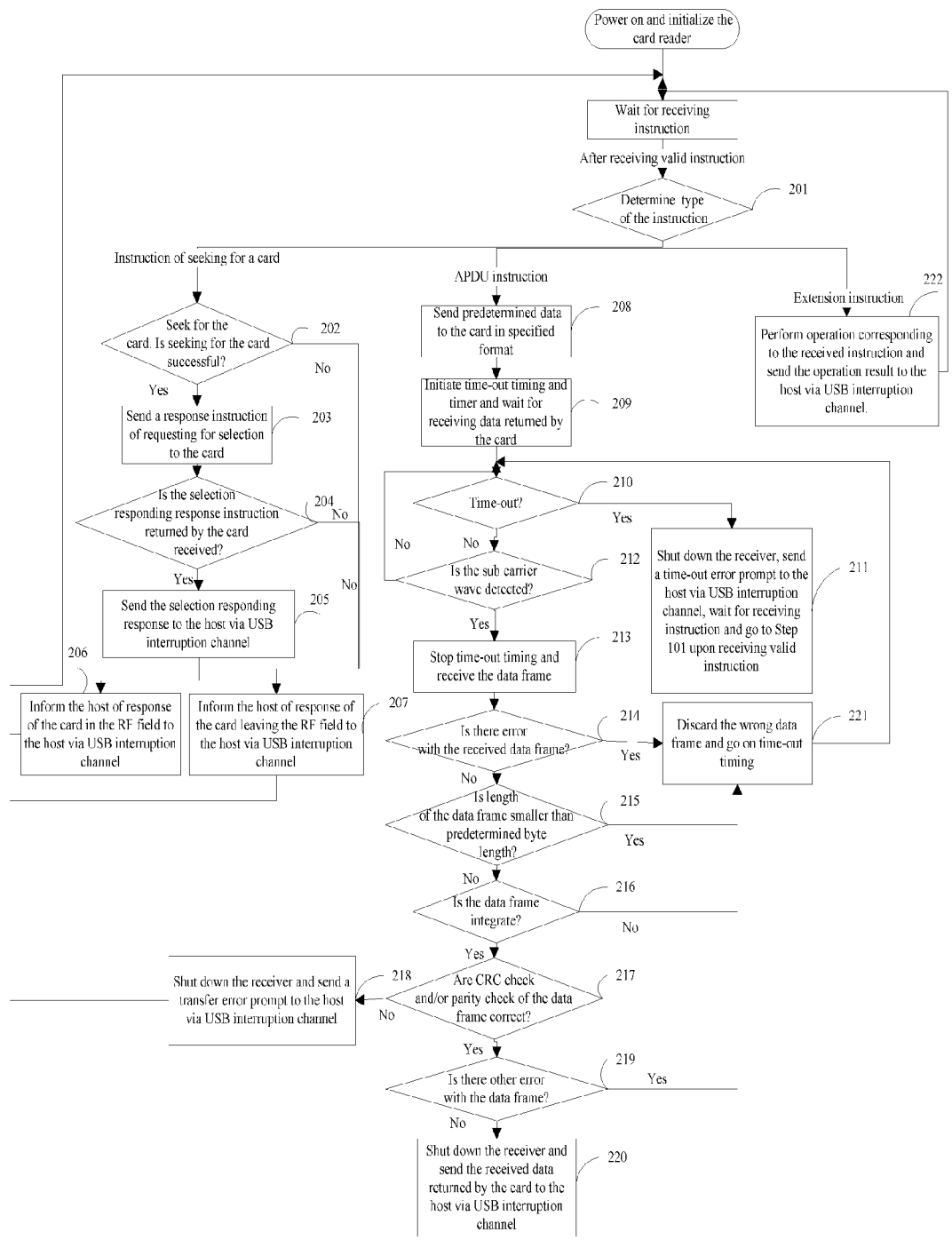
FIG. 3 is a flow chart of a method for enhancing stability of communication between a contactless card and a card reader according to Embodiment 2 of the invention.

As illustrated in FIG. 3, embodiment 2 provides an implementation method for enhancing stability of communication between a contactless card and a card reader. In the method, the card reader waits for receiving instruction sent by a host upon power on and initialization. Specifically, in the embodiment, the card reader receives instruction sent from a buffer through a USB interruption channel. If a first byte of the instruction is within a preset range, such as 0x01-0x03, valid instruction is deemed to be received. If the card reader does not receive the instruction or the first byte of the received instruction is not a preset value, the received instruction is deemed not valid instruction. The card reader performs the following steps upon receiving valid instruction.

Step 201, determining type of the instruction, if the instruction is an instruction of informing of card seeking, going to Step 202; if the instruction is an APDU instruction, going to Step 208; if the instruction is an extension instruction, going to Step 222.

Preferably, in the embodiment, the card reader determines a first byte of the received instruction, if it is 0x01, the instruction is deemed as the instruction of informing of card seeking; if it is 0x02, the instruction is deemed as the APDU instruction; if it is 0x03, the instruction is deemed as the extension instruction, where the extension instruction may be such as instruction of opening a RF field, instruction of closing the RF field, instruction of lighting up, instruction of lighting off and buzzer instruction, etc.

Step 202, performing card seeking operation and determining whether the card seeking operation is successful, if yes, going to Step 203; otherwise, going to Step 207.

Specifically, for an A-type card, Step 202 includes the following steps.

Step A1, sending a first request instruction 0x52 to the card and determining whether a first response 0x02 and 0x00 responsed by the card is received, if yes, going to Step A2; otherwise, deeming card seeking is failed and going to Step 207.

Specifically, the first response is preset data corresponding to the first request instruction, but not limited to data provided by the embodiment.

Step A2, sending a data packet comprised of data 0x93 and 0x20 and determining whether a second response including UID1 and UID2 is received, if yes, going to Step A3; otherwise, deeming the card seeking is failed and going to Step 207.

Specifically, UID1 is a group of data of 4-byte card number segment or a random number generated dynamically by the card, and BBC1 is a check byte of UID1.

Step A3, sending a data packet comprised of data 0x93, 0x70, UID1, BBC1 and CRC1, and determining whether first confirmation information including S1 and CRC1 returned by the card is received, if yes, going to Step A4; otherwise, deeming the card seeking is failed and going to Step 207.

Specifically, CRC1 is check detecting code and S1 is used to identify a start of communication.

Step A4, performing AND operation on the first confirmation information and constant data 0x40, determining whether the operation result is 0x00, if yes, deeming card seeking is successful, cascade level of the card being 1, storing the card number information of the card in the buffer and going to Step 203; otherwise, going to Step A5.

Specifically, if the cascade level of the card is 1, card number information of the card is all four bytes of UID1.

Step A5, sending a data packet comprised of data 0x95 and 0x20 to the card and determining whether a third response including UID2 and BBC2 returned by the card is received, if yes, going to Step A6; otherwise, deeming the card seeking is failed and going to Step 207.

Specifically, UID2 is a group of constant data of 4-byte card number segment or a random number generated dynamically by the card and BBC2 is a check byte of UID2.

Step A6, sending a data packet comprised of data 0x95, 0x70, UID2, BBC2 and CRC2 and determining whether second confirmation information including S2 and CRC2 returned by the card is received, if yes, going to Step A7; otherwise, deeming the card seeking is failed and going to Step 207.

Specifically, CRC2 is a check detecting code and S2 is used to identify a start of communication.

Step A7, performing AND operation on the second confirmation information and constant data 0x40 and determining whether the operation result is 0x00, if yes, deeming the card seeking is successful, cascade level of the card being 2, storing the card number information of the card in the buffer and going to Step 203; otherwise, going to Step A8.

Specifically, if cascade level of the card is 2, card number information of the card is combination of the last 3 bytes of UID1 and all 4 bytes of UID2.

Step A8, sending a data packet comprised of data 0x97 and 0x20 to the card and determining whether a fourth response including UID3 and BBC3 returned by the card is received, if yes, going to Step A9; otherwise, deeming the card seeking is failed and going to Step 207.

Specifically, UID3 is a group of constant data of 4-byte card number segment or a random number generated dynamically by the card and BBC3 is a check byte of UID3.

Step A9, sending a data packet comprised of data 0x97, 0x70, UID3, BBC3 and CRC3 to the card and determining whether second confirmation information including S3 and CRC3 returned by the card is received, if yes, going to Step A10; otherwise, deeming the card seeking is failed and going to Step 207.

Specifically, CRC3 is a check detecting code and S3 is used to identify a start of communication.

Step A10, performing AND operation on third confirmation information and constant data 0x40 and determining whether the operation result is 0x00, if yes, deeming the card seeking is successful, cascade level of the card being 3, storing the card number information of the card in the buffer and going to Step 203; otherwise, deeming the card seeking is failed and going to Step 207.

Specifically, if cascade level of the card is 3, card number information of the card is combination of last 3 bytes of UID1, last 3 bytes of UID2 and all 4 bytes of UID3.

Specifically, for a B-type card, Step 202 includes the following steps.

Step B1, sending a B-type request instruction, such as 0x05, 0x00, 0x08, CRC (two bytes), to the card.

Step B2, determining whether a B-type request response such as 0x1d, PUPI (4 bytes), 0x00, 0x08, 0x01, 0x00, CRC (2 bytes) returned by the card is received, if yes, deeming the card seeking is successful and going to Step 203; otherwise, deeming the card seeking is failed and going to Step 207.

Specifically, PUPI is used to represent the card number information.

Step 203, sending response instruction of requesting for selection.

Specifically, in the embodiment, the response instruction of requesting for selection is E0, 80, CRC.

Step 204, determining whether a selection responding response returned by the card is received, if yes, going to Step 205, otherwise, going to Step 207.

Step 205, sending the selection responding response to the host through the USB interruption channel.

Step 206, informing a response of the card in the RF field to the host through the USB interruption channel, waiting for receiving instruction and going to Step 201 upon receiving valid instruction.

Step 207, informing a response of the card leaving the RF field to the host through the USB interruption channel, waiting for receiving instruction and going to Step 201 upon receiving valid instruction.

Step 208, sending the received APDU instruction to the card in a specified format.

Specifically, in the embodiment, the specified format is PCB, NAD, CID, APDU instruction, CRC, where PCB is a protocol controlling byte, NAD is a node address, CID is a card identifier and CRC is a check detecting code.

Step 209, initiating time-out timing and a receiver and waiting for receiving data returned by the card.

Step 210, determining whether timeout happens, if yes, going to Step 211, otherwise, going to Step 212.

Step 211, shutting down the receiver, sending a time-out error prompt to the host through the USB interruption channel, waiting for receive instruction and going to Step 201 upon receiving valid instruction.

Step 212, determining whether a sub-carrier wave is detected, if yes, going to Step 213; otherwise, returning to Step 210.

Specifically, in the embodiment, the signal sent outside by the card reader is defined as carrier wave and the outside signal detected by the card reader is defined as a sub-carrier wave.

Step 213, stopping time-out timing and receiving data frame.

Step 214, determining whether there is frame error in the received data frame, if yes, going to Step 221; otherwise, going to Step 215.

The step of determining whether there is frame error in the received data frame includes determining whether the data frame is received, determining whether there is frame header error and frame footer error in data frame, and determining whether the received data frame is a vacant frame. If at least one of the above four determining results is positive, the received data frame is deemed wrong. If all the above four determining results are negative, the received data frame is deemed correct.

Specifically, the frame header error and frame footer error includes that data representing start or end of the data frame in the frame header or the frame footer is not satisfied with protocol; the vacant frame refers to the data frame which only includes frame header and frame footer and does not include data. In the embodiment, 0x10 represents frame header and 0x01 represents frame footer.

Step 215, determining whether length of the data frame is smaller than preset byte, if yes, going to Step 221; otherwise, going to Step 216.

Preferably, in the embodiment, the preset byte is 4.

Step 216, determining whether the data frame is integrate, if yes, going to Step 217; otherwise, going to Step 221.

Specifically in the embodiment, the step of determining whether the data frame is integrate includes determining whether bit number of the data frame is integer times of 8, if yes, deeming the data frame is integrate; otherwise, deeming the data frame is not integrate.

Step 217, determining whether CRC check and/or parity check of the received data frame are correct, if yes, going to Step 219; otherwise, going to Step 218.

Step 218, shutting down the receiver, sending a transfer error prompt to the host through the USB interruption channel, waiting for receiving instruction and going to Step 201 upon receiving valid instruction.

Step 219, determining whether there is other error in the data frame, if yes, going to Step 221; otherwise, going to Step 220.

Specifically, other error includes that length of the data frame is larger than the length regulated by the protocol or smaller than the minimum length regulated by the protocol.

Step 220, shutting down the receiver, sending the received data returned by the card to the host through the USB interruption channel, waiting for receiving instruction and going to Step 201 upon receiving valid instruction.

Step 221, discarding the wrong data frame, going on time-out timing and returning to Step 210.

Step 222, performing operation corresponding to the received instruction and sending the operation result to the host through the USB interruption channel.

Taking the instruction of requesting for lighting up as an example, the card reader lights up upon receiving the instruction of requesting for lighting up, and sending successful operation information or failed operation information to the host through the USB interruption channel. The successful operation information is 0x00 and the failed operation information is 0x01.

Figure 4:
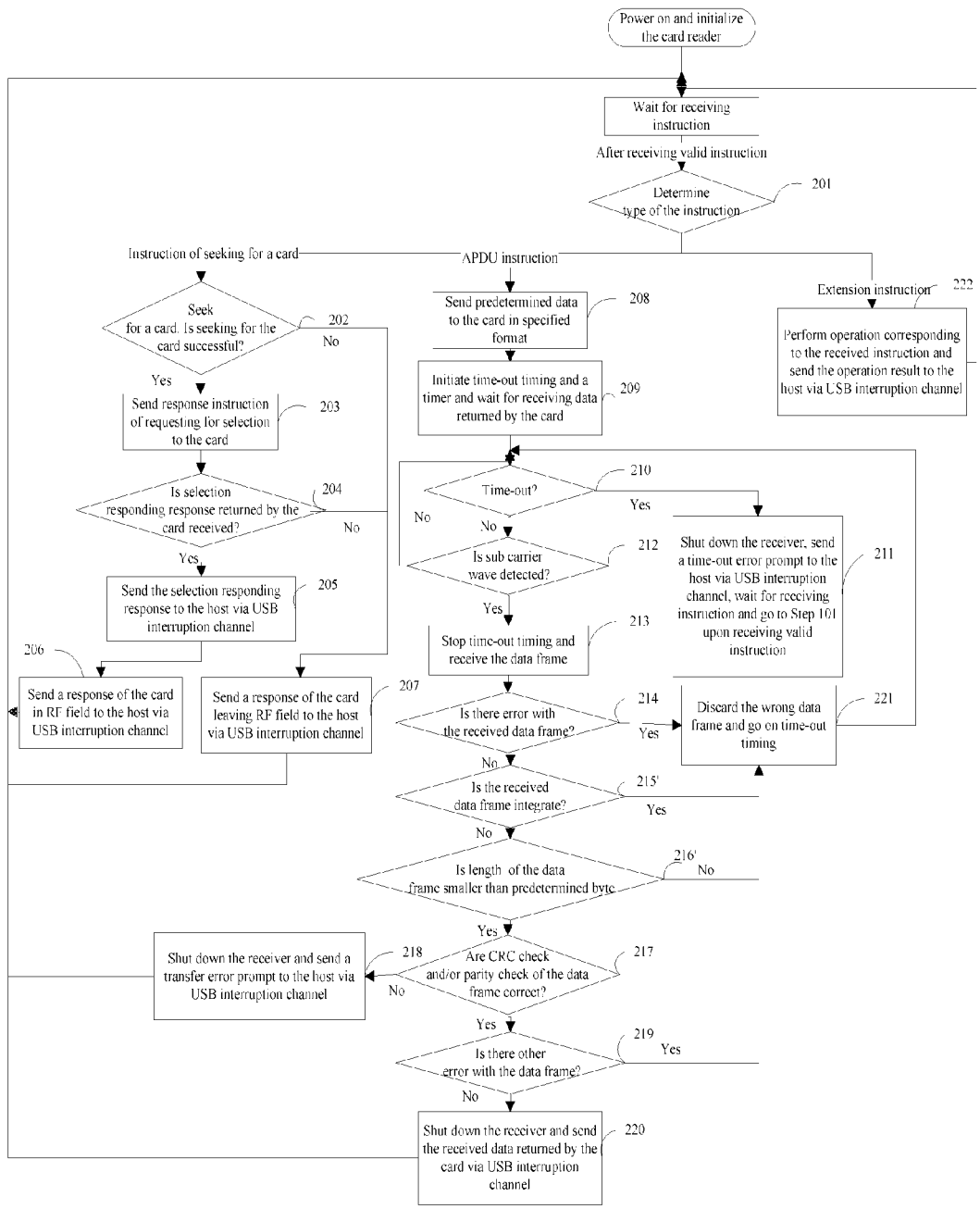
FIG. 4 is a flow chart of another method for enhancing stability of communication between a contactless card and a card reader according to Embodiment 2 of the invention.

As illustrated in FIG. 4, Steps 215 and 216 can be replaced with Steps 215' and 216'.

Step 215', determining whether the received data frame is integrate, if yes, going to Step 216'; otherwise, going to Step 221.

Step 216', determining whether length of the data frame is smaller than a preset byte, if yes, going to Step 221; otherwise, going to Step 217.

Preferably, in the embodiment, the preset byte is 4.

The above mentioned are only part embodiments of the invention, but not limit to scope of the protection of the invention. Changes and substitutions made by any person skill in the art within technology scope disclosed by the invention should fall within the scope of the protection of the invention. Therefore, the scope of the protection of the invention should be based on scope of the protection of the claims.

What is claimed is:

1. A method for enhancing stability of communication between a contactless card and a card reader, comprising
    Step a, initiating, by the card reader having a receiver, time-out timing and a receiver, and waiting for receiving data returned by the card;
    Step b, determining, by the card reader, whether time-out happens, if yes, shutting down the receiver and sending a time-out error prompt to a host; otherwise, going to Step c;
    Step c, determining, by the card reader, whether a sub-carrier wave is detected, if yes, stopping time-out timing, receiving a data frame and going to Step d; otherwise, returning to Step b; the sub-carrier wave being outside carrier wave signal detected by the card reader;
    Step d, determining, by the card reader, whether there is a frame error in the received data frame, wherein the frame error comprises that the data frame is not received or there is frame header error or frame footer error in the received data frame or the received data frame is a vacant frame; if yes, discarding the received data frame, going on time-out timing and returning to Step b; otherwise, going to Step e;
    Step e, determining, by the card reader, whether CRC check and/or parity check of the received data frame are correct, if yes, going to Step h; otherwise, going to Step f;
    Step f, determining, by the card reader, whether length of the received data frame is smaller than preset byte, if yes, discarding the received data frame, going on time-out timing and returning to Step b; otherwise, going to Step g;
    Step g, determining, by the card reader, whether the received data frame is integrate, if yes, shutting down the receiver and sending a transfer error prompt to the host; otherwise, discarding the received data frame, going on time-out timing and returning to Step b; wherein the determining whether the received data frame is integrate comprises determining, by the card reader, whether bit number of the received data frame is integer times of 8, if yes, the received data frame is integrate; if no, the received data frame is not integrate; and
    Step h, determining, by the card reader, whether there is other error in the received data frame, wherein other error comprises that length of the data frame is larger than length regulated by a protocol or smaller than minimum length regulated by the protocol; if yes, discarding the received data frame, going on time-out timing and returning to Step b; otherwise, shutting down the receiver and sending the received data returned by the card to the host.

2. The method of claim 1, wherein the sending a time-out error prompt to a host comprises sending the time-out error prompt to the host through a USB interruption channel;
    the sending a transfer error prompt to a host comprises sending the transfer error prompt to the host through a USB interruption channel; and
    the sending received data returned by the card to the host comprises sending the received data returned by the card to the host through a USB interruption channel.

3. The method of claim 1, wherein, before initiating time-out timing by the card reader, the method further comprises:
    powering on and initializing the card reader, and determining, by the card reader, type of instruction upon receiving valid instruction;
    is a card seeking instruction, performing, by the card reader, card seeking operation and determining whether the card seeking operation is successful, if yes, sending, by the card reader, a response instruction of requesting for selection, sending selection responding instruction to the host upon receiving a selection responding response returned by the card and informing the host of a response of the card in a radio frequency field through a USB interruption channel; if no, informing, by the card reader, the host of a response of the card leaving the radio frequency field through a USB interruption channel;
    if the valid instruction is an APDU instruction, sending, by the card reader, the APDU instruction to the host in specified form and going to Step a; and
    if the valid instruction is an extension instruction, executing, by the card reader, the extension instruction and sending an operation result to the host through a USB interruption channel.

4. A method of enhancing stability of communication between a contactless card and a card reader, comprising:
    Step A, initiating, by the card reader having a receiver, time-out timing, and waiting for receiving data returned by the card;
    Step B, determining, by the card reader, whether time-out happens, if yes, shutting down the receiver and sending a time-out error prompt to a host; otherwise, going to Step C;
    Step C, determining, by the card reader, whether a sub-carrier wave is detected, if yes, stopping time-out timing, receiving a data frame and going to Step D; otherwise, returning to Step B; the sub-carrier wave being an outside carrier wave signal detected by the card reader;
    Step D, determining, by the card reader, whether there is frame error in the received data frame, wherein the frame error comprises that the data frame is not received or there is frame header error or frame footer error in the received data frame or the received data frame is a vacant frame; if yes, discarding the received data frame, going on time-out timing and returning to Step B; otherwise, going to Step E;
    Step E, determining, by the card reader, whether length of the received data frame is smaller than preset byte, if yes, discarding the received data frame, going on time-out timing and returning to Step B; otherwise, going to Step F;
    Step F, determining, by the card reader, whether the received data frame is integrate, if yes, going to Step G; otherwise, discarding the received data frame, going on time-out timing and returning to Step B, wherein the determining whether the received data frame is integrate comprises determining, by the card reader, whether bit number of the received data frame is integer times of 8, if yes, the received data frame is integrate; if no, the received data frame is not integrate;
    Step G, determining, by the card reader, whether CRC check and/or parity check are correct, if yes, going to Step H; otherwise shutting down the receiver and sending a transfer error prompt to the host; and Step H, determining, by the card reader, whether there is other error in the data frame, wherein other error comprises that length of the data frame is larger than length regulated by a protocol or smaller than minimum length regulated by the protocol; if yes, discarding the received data frame, going on time-out timing and returning to Step B; otherwise, shutting down the receiver and sending the received data returned by the card to the host.

5. The method of claim 4, wherein the sending a timeout error prompt to a host comprises sending the time-out error prompt to the host through a USB interruption channel;

the sending a transfer error prompt to a host comprises sending the transfer error prompt to the host through a USB interruption channel; and the sending received data returned by the card to the host comprises sending the received data returned by the card to the host through a USB interruption channel.

6. The method of claim 4, wherein, before initiating time-out timing by the card reader, the method further comprises:

powering on and initializing the card reader, and determining, by the card reader, type of instruction upon receiving valid instruction;

if the valid instruction is card seeking instruction, performing, by the card reader, card seeking operation and determining whether the card seeking operation is successful, if yes, sending, by the card reader, a response instruction of requesting for selection to the card, sending the selection responding instruction to the host upon receiving a selection responding response returned by the card and informing the host of a response of the card in a radio frequency field through a USB interruption channel; if no, informing, by the card reader, the host of a response of the card leaving the radio frequency field through a USB interruption channel;

if the valid instruction is an APDU instruction, sending, by the card reader, the APDU instruction to the host in specified format and going to Step A; and if the valid instruction is an extension instruction, executing, by the card reader, the extension instruction and sending an operation result to the host through a USB interruption channel.

7. A method for enhancing stability of communication between a contactless card and a card reader, comprising:

Step a, initiating, by the card reader having a receiver, time-out timing, and waiting for receiving data returned by the card;

Step b, determining, by the card reader, whether time-out happens, if yes, shutting down the receiver and sending a time-out error prompt to a host; otherwise, going to Step c;

Step c, determining, by the card reader, whether a sub-carrier wave is detected, if yes, stopping time-out timing, receiving a data frame and going to Step d; otherwise, returning to Step b; the sub-carrier wave being outside carrier wave signal detected by the card reader;

Step d, determining, by the card reader, whether there is a frame error in the received data frame, wherein the frame error comprises that the data frame is not received or there is frame header error or frame footer error in the received data frame or the received data frame is a vacant frame; if yes, discarding the received data frame, going on time-out timing and returning to Step b; otherwise, going to Step e;

Step e, determining, by the card reader, whether CRC check and/or parity check of the received data frame are correct, if yes, going to Step h; otherwise, going to Step f;

Step f, determining, by the card reader, whether the received data frame is integrate, if yes, going to Step g; otherwise, discarding the received data frame, going on time-out timing and returning to Step b; wherein the determining whether the received data frame is integrate comprises determining, by the card reader, whether bit number of the received data frame is integer times of 8, if yes, the received data frame is integrate; if no, the received data frame is not integrate;

Step g, determining, by the card reader, whether length of the received data frame is smaller than preset byte, if yes, discarding the received data frame, going on time-out timing and returning to Step b; otherwise, shutting down the receiver and sending a transfer error prompt to the host; and Step h, determining, by the card reader, whether there is other error in the received data frame, wherein other error comprises that length of the data frame is larger than length regulated by a protocol or smaller than minimum length regulated by the protocol; if yes, discarding the received data frame, going on time-out timing and returning to Step b; otherwise, shutting down the receiver and sending the received data returned by the card to the host.

8. The method of claim 7, wherein the sending a time-out error prompt to a host comprises sending the time-out error prompt to the host through a USB interruption channel;

the sending a transfer error prompt to a host comprises sending the transfer error prompt to the host through a USB interruption channel; and the sending received data returned by the card to the host comprises sending the received data returned by the card to the host through a USB interruption channel.

9. The method of claim 7, wherein, before initiating time-out timing by the card reader, the method further comprises:

powering on and initializing the card reader, and determining, by the card reader, type of instruction upon receiving valid instruction;

if the valid instruction is a card seeking instruction, performing, by the card reader, card seeking operation and determining whether the card seeking operation is successful, if yes, sending, by the card reader, a response instruction of requesting for selection, sending selection responding instruction to the host upon receiving a selection responding response returned by the card and informing the host of a response of the card in a radio frequency field through a USB interruption channel; if no, informing, by the card reader, the host of a response of the card leaving the radio frequency field through a USB interruption channel;

if the valid instruction is an APDU instruction, sending, by the card reader, the APDU instruction to the host in specified form and going to Step a; and if the valid instruction is an extension instruction, executing, by the card reader, the extension instruction and sending an operation result to the host through a USB interruption channel.

10. A method of enhancing stability of communication between a contactless card and a card reader, comprising:

Step A, initiating, by the card reader having a receiver, time-out timing, and waiting for receiving data returned by the card;

Step B, determining, by the card reader, whether time-out happens, if yes, shutting down the receiver and sending a time-out error prompt to a host; otherwise, going to Step C;

Step C, determining, by the card reader, whether a sub-carrier wave is detected, if yes, stopping time-out timing, receiving a data frame and going to Step D; otherwise, returning to Step B; the sub-carrier wave being an outside carrier wave signal detected by the card reader;

Step D, determining, by the card reader, whether there is frame error in the received data frame, wherein the frame error comprises that the data frame is not received or there is frame header error or frame footer error in the received data frame or the received data frame is a vacant frame; if yes, discarding the received data frame, going on time-out timing and returning to Step B; otherwise, going to Step E;

Step E, determining, by the card reader, whether the received data frame is integrate, if yes, going to Step F; otherwise, discarding the received data frame, going on time-out timing and returning to Step B, wherein the determining whether the received data frame is integrate comprises determining, by the card reader, whether bit number of the received data frame is integer times of 8, if yes, the received data frame is integrate; if no, the received data frame is not integrate; and Step F, determining, by the card reader, whether length of the received data frame is smaller than preset byte, if yes, discarding the received data frame, going on time-out timing and returning to Step B; otherwise, shutting down the receiver and sending a transfer error prompt to the host;

Step G, determining, by the card reader, whether CRC check and/or parity check are correct, if yes, going to Step H; otherwise shutting down the receiver and sending a transfer error prompt to the host; and Step H, determining, by the card reader, whether there is other error in the data frame, wherein other error comprises that length of the data frame is larger than length regulated by a protocol or smaller than minimum length regulated by the protocol; if yes, discarding the received data frame, going on time-out timing and returning to Step B; otherwise, shutting down the receiver and sending the received data returned by the card to the host.

11. The method of claim 10, wherein the sending a timeout error prompt to a host comprises sending the time-out error prompt to the host through a USB interruption channel;

the sending a transfer error prompt to a host comprises sending the transfer error prompt to the host through a USB interruption channel; and the sending received data returned by the card to the host comprises sending the received data returned by the card to the host through a USB interruption channel.

12. The method of claim 10, wherein before initiating time-out timing by the card reader, the method further comprises:

powering on and initializing the card reader, and determining, by the card reader, type of instruction upon receiving valid instruction;

if the valid instruction is card seeking instruction, performing, by the card reader, card seeking operation and determining whether the card seeking operation is successful, if yes, sending, by the card reader, a response instruction of requesting for selection to the card, sending the selection responding instruction to the host upon receiving a selection responding response returned by the card and informing the host of a response of the card in a radio frequency field through a USB interruption channel; if no, informing, by the card reader, the host of a response of the card leaving the radio frequency field through a USB interruption channel;

if the valid instruction is an APDU instruction, sending, by the card reader, the APDU instruction to the host in specified format and going to Step A; and if the valid instruction is an extension instruction, executing, by the card reader, the extension instruction and sending an operation result to the host through a USB interruption channel.

* * * * *